US006536088B1

(12) United States Patent
Chiang

(10) Patent No.: US 6,536,088 B1
(45) Date of Patent: Mar. 25, 2003

(54) GEAR PULLER HAVING OUTWARDLY FORCED JAWS

(76) Inventor: Chen Chi Chiang, No. 52-27, Pu Hsin Street, Da Yuan Hsiang, Tauyuan Hsien (TW), 337

( * ) Notice: Subject to any disclaimer, the term of this patent is extended or adjusted under 35 U.S.C. 154(b) by 0 days.

(21) Appl. No.: 10/095,159

(22) Filed: Mar. 12, 2002

(51) Int. Cl.[7] .................................................. B23P 19/04
(52) U.S. Cl. ............................. 29/255; 29/263; 29/278; 29/270
(58) Field of Search .......................... 29/255, 278, 263, 29/270, 272, 282

(56) References Cited

U.S. PATENT DOCUMENTS 2,380,068 A * 7/1945 Patton ......................... 29/225
2,484,129 A 10/1949 Taylor
3,529,497 A * 9/1970 Brooks ......................... 29/225
3,800,391 A * 4/1974 Westbrook .................... 29/255
4,059,883 A * 11/1977 Osborne ....................... 29/259
5,890,271 A * 4/1999 Bromley et al. .............. 29/263
6,279,216 B1 * 8/2001 Halliday et al. .............. 29/280
6,167,605 B1 * 1/2002 Morales ........................ 29/282

* cited by examiner

*Primary Examiner*—Lee Wilson
(74) *Attorney, Agent, or Firm*—Charles E. Baxley

(57) ABSTRACT

A gear puller includes a barrel having an orifice formed in one end, a pair of jaws received in the barrel and each having one end extended outward through the orifice of the barrel and each having a peripheral flange for engaging into a bearing to be pulled. An actuator rod may be engaged into the jaws for moving the jaws away from each other to solidly engage with the bearing to be pulled. A shank is secured to the barrel and has a block. A hammer is slidably engaged on the shank and movable to strike onto the block for forcing the jaws to remove the bearing from the object.

6 Claims, 7 Drawing Sheets

GEAR PULLER HAVING OUTWARDLY FORCED JAWS

BACKGROUND OF THE INVENTION

1. Field of the Invention

The present invention relates to a gear puller, and more particularly to a gear puller having outwardly forced jaws to engage into the bearings to be removed.

2. Description of the Prior Art

Typical gear pullers comprise a number of jaws movable or engageable onto the outer peripheral portion of the gears or bearings, for pulling and disengaging the gears or bearings from the supporting objects. U.S. Pat. No. 3,484,129 to Taylor discloses one of the typical gear pullers also including three jaws for engaging onto the outer peripheral portion of the gears or bearings. The jaws may not be engaged into the bearings, such that this kind of typical gear puller may not be used for pulling and disengaging the bearings that are engaged in the cavities or depressions.

The present invention has arisen to mitigate and/or obviate the afore-described disadvantages of the conventional gear pullers.

SUMMARY OF THE INVENTION

The primary objective of the present invention is to provide a gear puller including two or more outwardly forced jaws to engage into the bearings that are engaged in the depressions or cavities of the objects and to disengage or remove the bearings from the objects.

In accordance with one aspect of the invention, there is provided a gear puller comprising a barrel including a first end having an orifice formed therein, a pair of jaws received in the barrel, and each including a first end extended outward through the or orifice of the barrel, and each includes a peripheral flange extended from the first end thereof for engaging into a bearing to be pulled, means for moving the jaws away from each other to solidly engage with the bearing to be pulled, and means for forcing the jaws to disengage the bearing from an object.

A bucket is further provided and secured to the barrel. A spring biasing device is further provided for biasing the first ends of the jaws outward of the orifice of the barrel and includes a spring and a collar received in the bucket and engaged onto the jaws.

The jaws each includes a hole formed therein, the moving means includes an actuator rod engaged into the holes of the jaws for moving the jaws away from each other and to engage with the bearing.

The forcing means includes a shank coupled to the actuator rod and having a block formed thereon, and a hammer slidably engaged on the shank and movable to strike onto the block for forcing the jaws to remove the bearing.

A hand grip is further provided and secured to the shank and including an aperture laterally formed therein, and an arm is engaged in the aperture of the hand grip for rotating the hand grip.

A spring biasing device is further provided for biasing the jaws toward each other. The jaws each includes an outer peripheral recess formed therein, the spring biasing device includes a retaining ring engaged into the outer peripheral recesses of the jaws.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
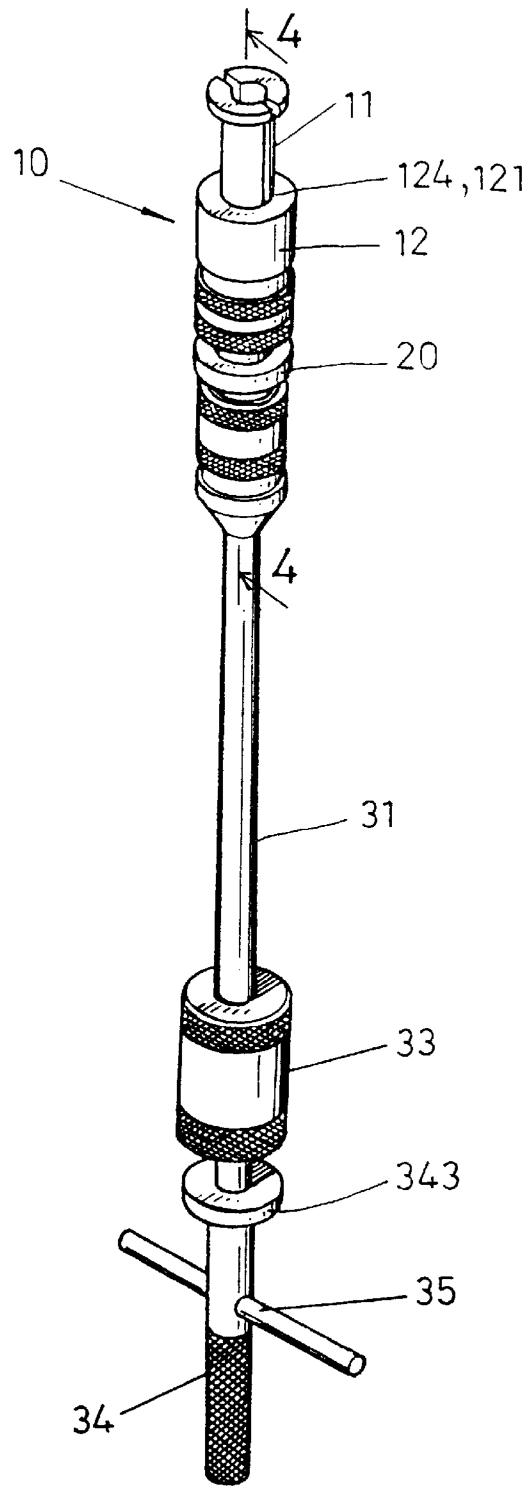
FIG. 1 is a perspective view of a gear puller in accordance with the present invention, which is disposed up side down.
Figure 2:
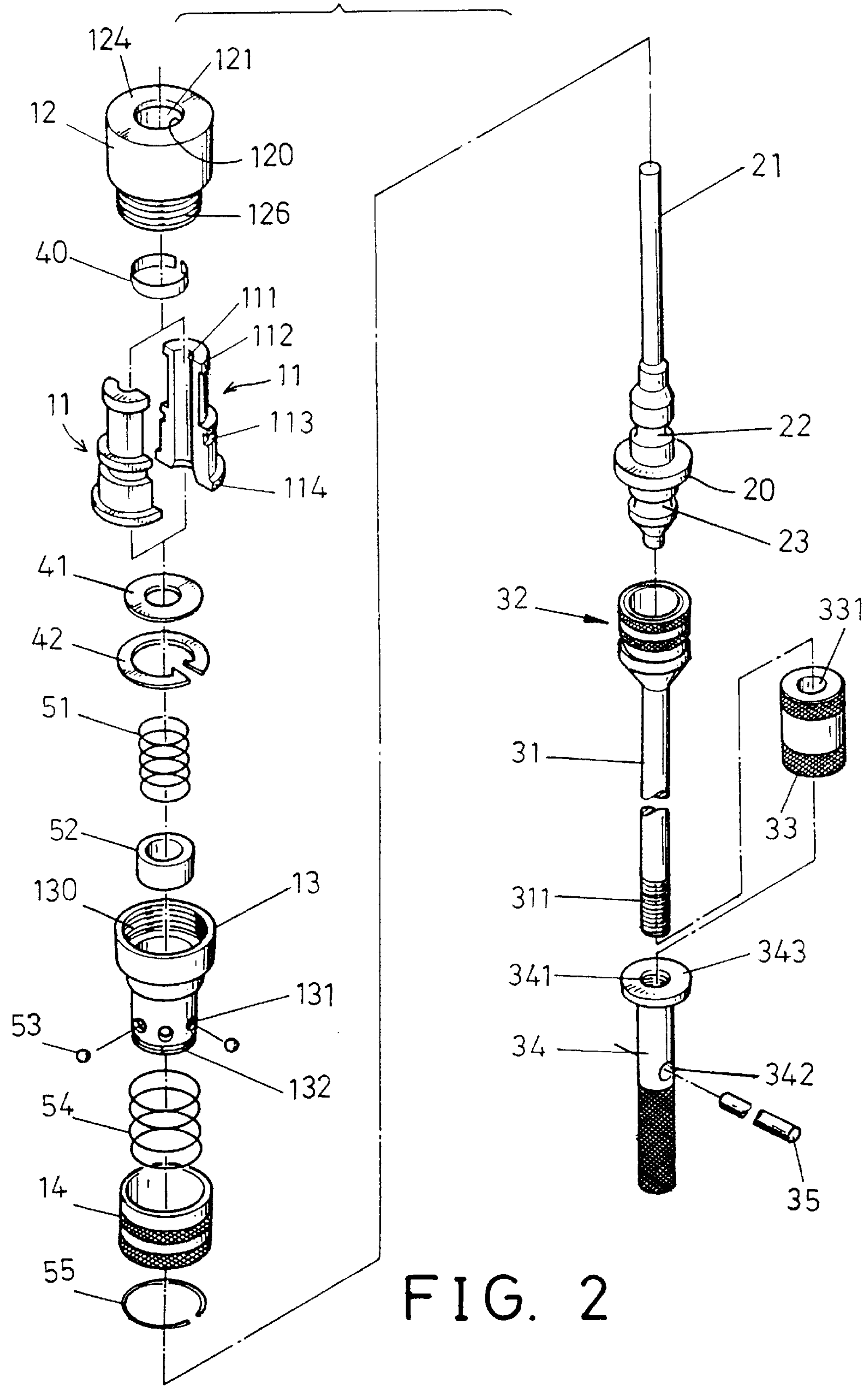
FIG. 2 is an exploded view of the gear puller.
Figure 3:
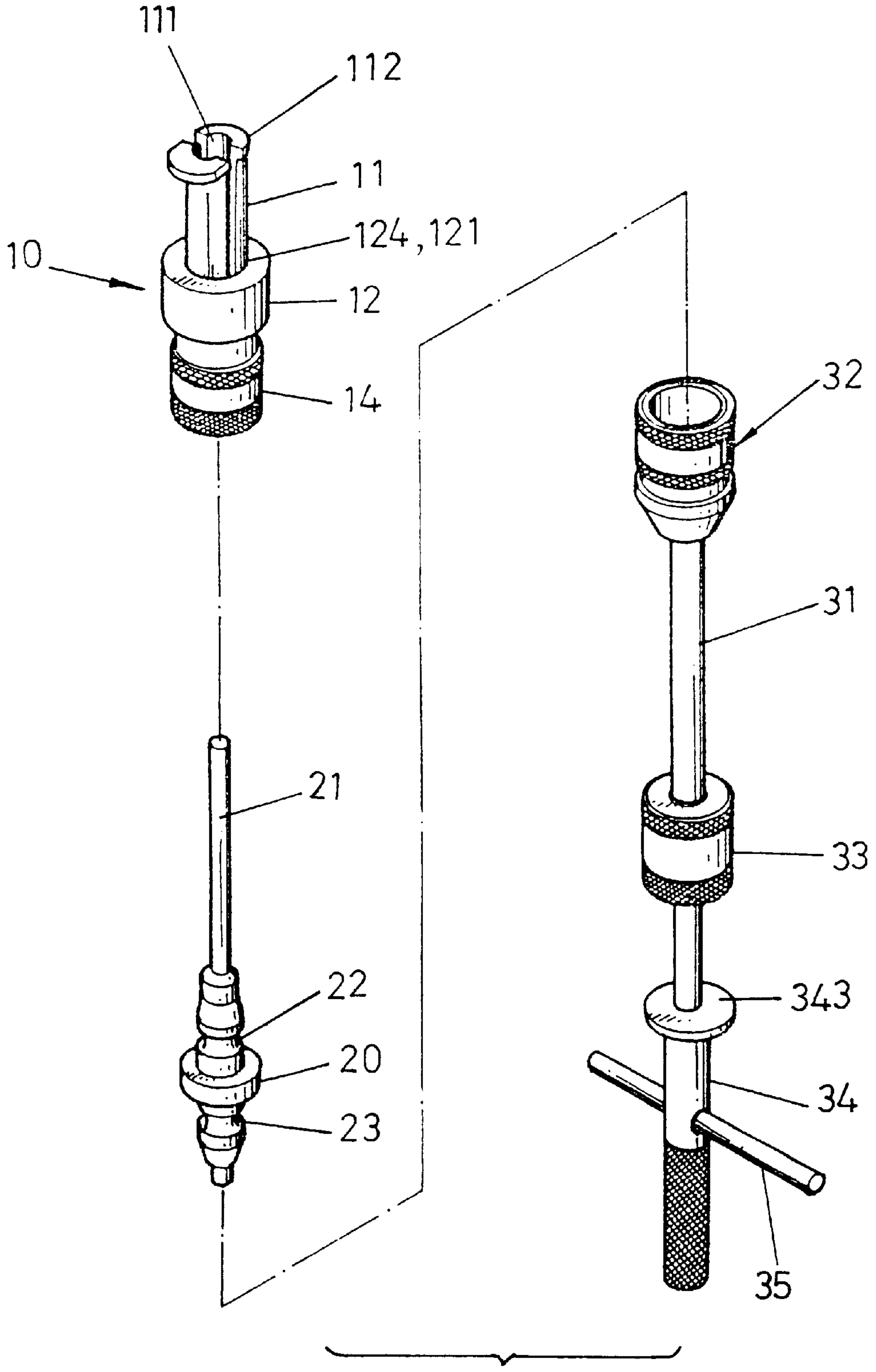
FIG. 3 is a partial exploded view of the gear puller.

Referring to the drawings, and initially to FIGS. 1–5, a gear puller in accordance with the present invention comprises a hand grip 34 including an aperture 342 laterally formed therein for receiving an arm 35 which is substantially perpendicular to the hand grip 34 for rotating and driving the hand grip 34. The hand grip 34 includes a screw hole 341 formed in one end thereof, and includes a block 343 formed and provided on the one end thereof. A shank 31 includes a threaded portion or an outer thread 311 formed on one end thereof for threading and secured to the screw hole 341 of the hand rip 34, and includes a quick coupler 32 attached to the other end thereof. A hammer 33 includes a bore 331 formed therein for slidably receiving the shank 31 and for allowing the hammer 33 to be moved along the shank 31, and for allowing the hammer 33 to be stricken onto the block 343.

A gear coupling device 10 includes a barrel 12 having a chamber 120 formed therein, and having a peripheral flange 124 extended radially inward from one end thereof for forming or defining an orifice 121 in the one end thereof, and having a space 122 formed in the other end thereof which includes an inner diameter greater than that of the chamber 120 thereof. A pair of jaws 11 each includes about one-half (½) of a cylindrical member or each includes a semi-cylindrical structure having a hole 111 formed therein, and each includes a peripheral flange 112 and a peripheral stop 114 formed on the ends thereof. One ends of the jaws 11 and the flanges 112 are extended outward of the barrel 12. The peripheral stops 114 of the jaws 11 are engaged in the enlarged space 122 of the barrel 12 (FIG. 4) for rotatably securing the jaws 11 to the barrel 12.

Figure 4:
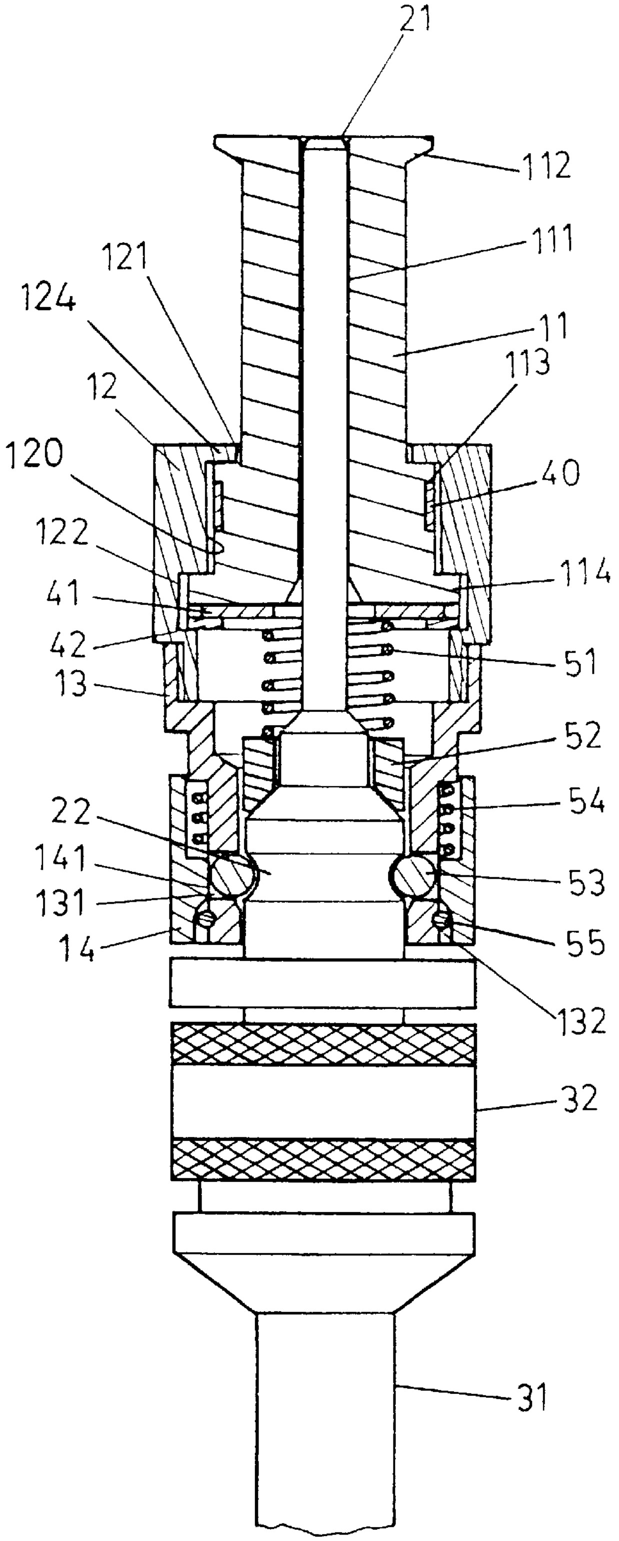
FIG. 4 is a partial cross sectional view taken along lines 4—4 of FIG. 1.
Figure 5:
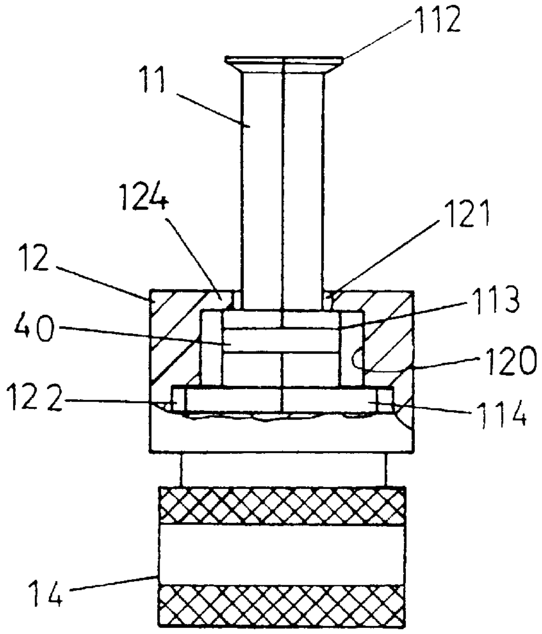
FIG. 5 is a partial cross sectional view of the gear puller.

A retaining ring 40 is engaged around the peripheral recesses 113 of the jaws 11 for biasing the jaws 11 toward each other, best shown in FIGS. 4, 5. The barrel 12 includes an outer thread 126 formed in the other end thereof. A bucket 13 includes an inner thread 130 formed in one end thereof for threading to the outer thread 126 of the barrel 12 and for detachably securing the bucket 13 to the barrel 12. A washer 41 and a clamping ring 42 are engaged onto the jaws 11, and a spring 51 and a collar 52 are further engaged onto the jaws 11 or the washer 41 or the clamping ring 42 for biasing the jaws 11 outward of the barrel 12.

Figure 6:
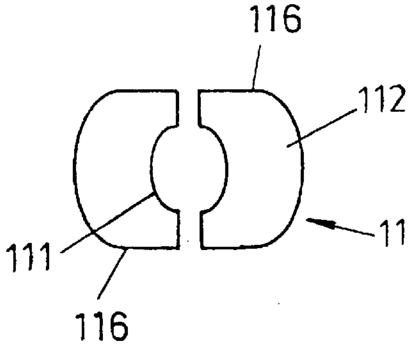
FIG. 6 is an end view of the jaws of the gear puller.
Figure 7:
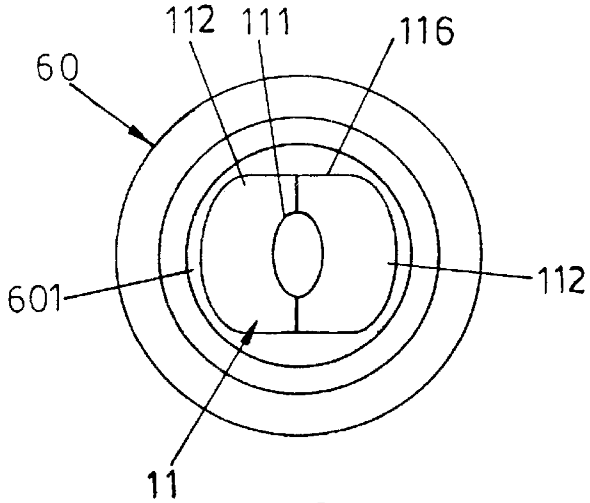
FIG. 7 is a plan schematic view illustrating the engagement of the jaws into the bearing to be removed by the gear puller.
Figure 8:
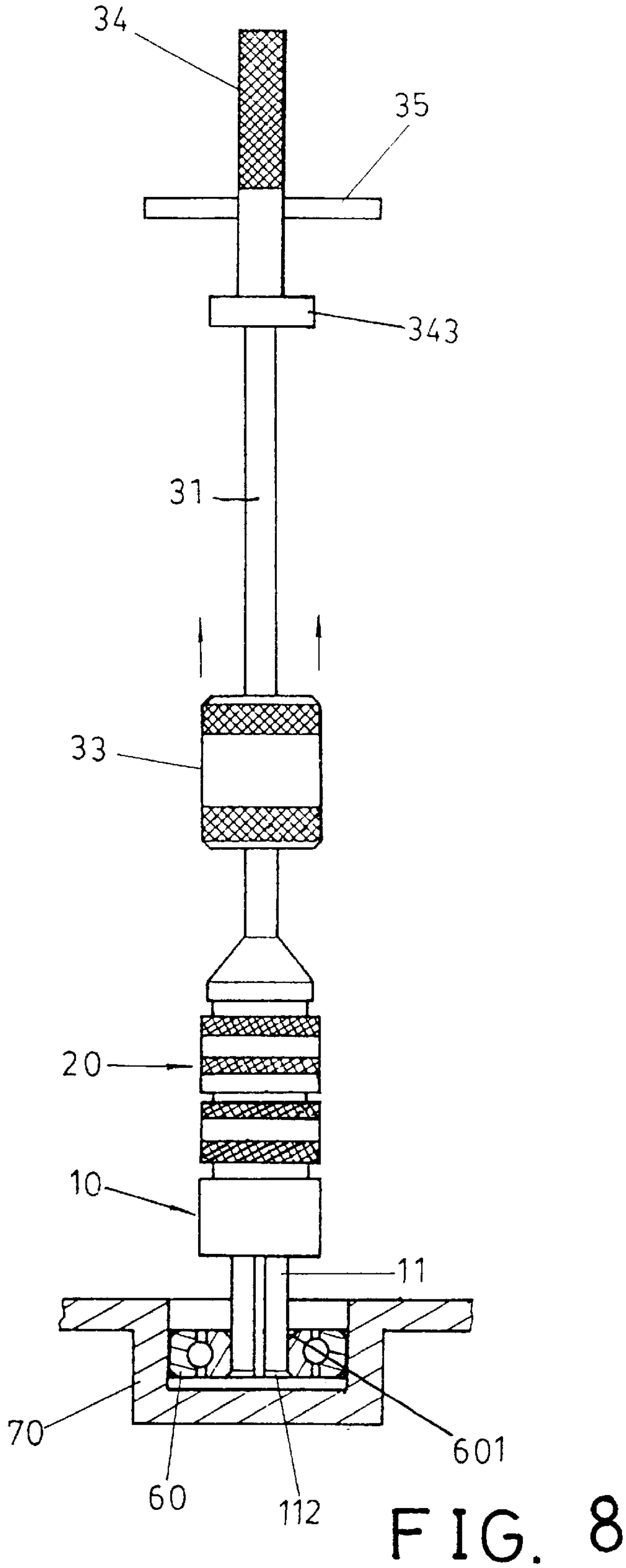
FIG. 8 is a partial cross sectional view illustrating the operation of the gear puller.
Figure 9:
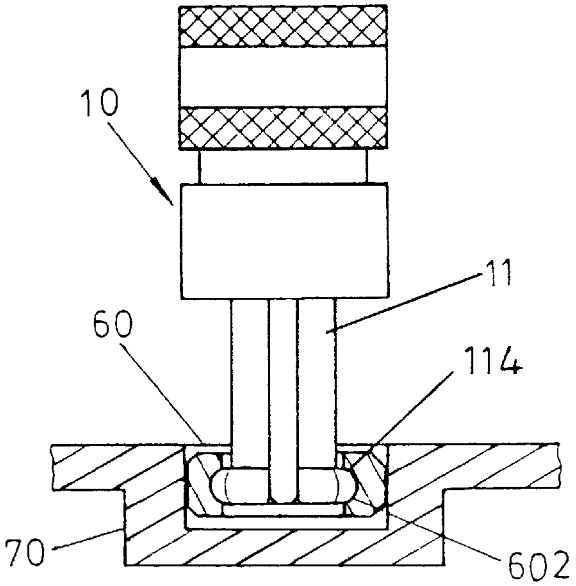
FIG. 9 is a partial cross sectional view illustrating the engagement of the jaws into the broken or damaged bearing to be removed by the gear puller.

An actuator rod 21 is engaged through the collar 52 and the spring 51 and the clamping ring 42 and the washer 41 and engaged through the holes 111 of the jaws 11, for forcing the jaws 11 away from each other against the retaining ring 40, and for forcing the peripheral flanges 112 of the jaws 11 to engage with or into the inner hole 601 of the bearing 60 to be pulled, best shown in FIGS. 7–9. The jaws 11, as shown in FIG. 6, preferably include a cut off portion 116 formed therein for allowing the peripheral flanges 112 of the jaws 11 to be easily engaged into the hole 601 of the bearing 60. The actuator rod 21 includes a peripheral wall 20 formed on the other end thereof, and includes two peripheral grooves 22, 23 formed beside the peripheral wall 20 thereof. The actuator rod 21 may engage with the collar 52 and thus the spring 51 in order to bias the ends of the jaws 11 outward of the barrel 12.

The bucket 13 includes one or more orifices 131 formed in the other end thereof each for receiving a ball 53 therein. A ferrule 14 is slidably engaged onto the bucket 13 and includes a peripheral bulge 141 extended radially inward therefrom for engaging with the balls 53 and for forcing the balls 53 inward of the peripheral groove 22 of the actuator rod 20 and for detachably locking the actuator rod 20 to the bucket 13. A spring 54 is engaged between the ferrule 14 and the bucket 13 for biasing the peripheral bulge 141 of the ferrule 14 to engage with and to force the balls 53 to engage with and to lock the actuator rod 20 to the bucket 13. The balls 53 may be disengaged from the actuator rod 20 when the peripheral bulge 141 of the ferrule 14 is disengaged from the balls 53 by moving the ferrule 14 against the spring 54.

Accordingly, the balls 53 may be quickly forced to engage into or with the actuator rod 20 for quickly locking the actuator rod 20 to the bucket 13 by moving the ferrule 14 relative to the bucket 13 against the spring 54. When the ferrule 14 is moved relative to the bucket 13 against the spring 54 until the peripheral bulge 141 of the ferrule 14 is disengaged from the balls 53, the balls 53 may be disengaged from the actuator rod 20 such that the actuator 20 may be easily and quickly removed from the bucket 13. A retaining ring 55 may further be provided and engaged into a peripheral slot 132 of the bucket 13 for engaging with the ferrule 14 and for retaining the ferrule 14 to the bucket 13 and for preventing the ferrule 14 from being disengaged from the bucket 13.

The quick coupler 32 of the shank 31 includes a configuration similar to the ferrule 14 and the balls 53 for quickly coupling or locking the quick coupler 32 to the actuator rod 20. For example, the quick coupler 32 may include the other balls for engaging into the other peripheral groove 23 of the actuator rod 20 and for releasably or detachably securing the actuator rod 20 to the shank 31.

In operation, the jaws 11 (FIGS. 5, 7) may first be engaged into the inner hole or cavity 601 of a bearing 60 to be pulled. The actuator rod 20 may then be engaged into the holes 111 of the jaws 11 for forcing the jaws 11 away from each other against the retaining ring 40, and for forcing the peripheral flanges 112 of the jaws 11 to solidly engage with the bearing 60 to be pulled. As shown in FIG. 8, the hammer 33 may then be moved along the shank 31 and may then be stricken onto the block 343 for pulling the bearing 60 out of the cavity of the object 70. As shown in FIG. 9, the peripheral flanges 112 of the jaws 11 may also be solidly engaged into the damaged outer shell 602 of the bearing 60 to be pulled.

Figure 10:
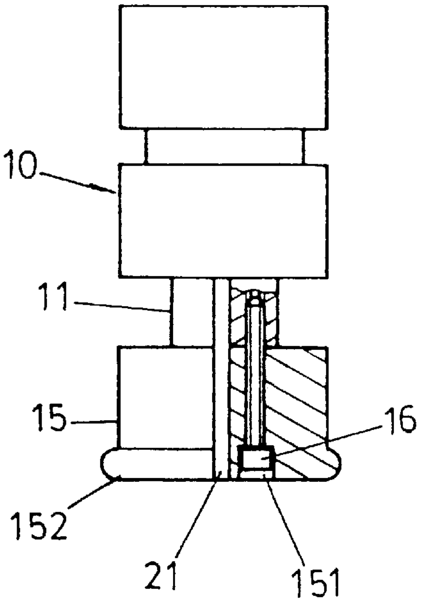
FIG. 10 is a plan schematic view illustrating the other embodiment of the gear puller, in which a portion of the jaws has been cut off.
Figure 11:
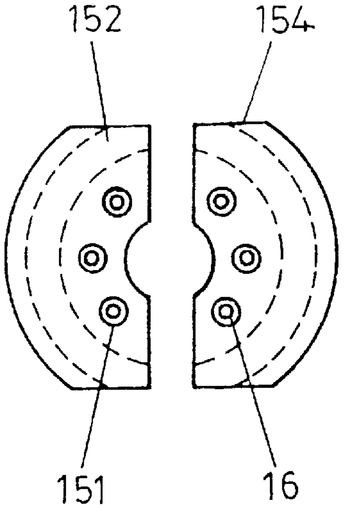
FIG. 11 is an end view of the jaws of the gear puller as shown in FIG. 10.

Referring next to FIGS. 10 and 11, one or more pairs of jaw members 152 may further be provided and each includes a number of holes 151 formed therein for receiving fasteners 16, and each also includes a peripheral flange 152 for engaging into the bearing to be pulled. The jaw members 15 each further preferably includes a cut off portion 154 formed therein for allowing the jaw members 15 to be easily engaged into the bearings to be pulled.

Accordingly, the gear puller in accordance with the present invention includes two or more outwardly forced jaws to engage into the bearings that are engaged in the depressions or cavities of the objects and to disengage or remove the bearings from the objects.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A gear puller comprising:

a barrel including a first end having an orifice formed therein, a pair of jaws received in said barrel, and each including a first end extended outward through said orifice of said barrel, and each includes a peripheral flange extended from said first end thereof for engaging into a bearing to be pulled, means for moving said jaws away from each other to solidly engage with the bearing to be pulled, and means for forcing said jaws to disengage the bearing from an object, a bucket secured to said barrel, and means for biasing said first ends of said jaws outward of said orifice of said barrel, and said biasing means including a spring and a collar received in said bucket and engaged onto said jaws.

2. The gear puller according to claim 1, wherein said jaws each includes a hole formed therein, said moving means includes an actuator rod engaged into said holes of said jaws for moving said jaws away from each other and to engage with the bearing.

3. The gear puller according to claim 2, wherein said forcing means includes a shank coupled to said actuator rod and having a block formed thereon, and a hammer slidably engaged on said shank and movable to strike onto said block for forcing said jaws to remove the bearing.

4. The gear puller according to claim 3 further comprising a hand grip secured to said shank and including an aperture laterally formed therein, and an arm engaged in said aperture of said hand grip for rotating said hand grip.

5. The gear puller according to claim 1 further comprising means for biasing said jaws toward each other.

6. The gear puller according to claim 5, wherein said jaws each includes an outer peripheral recess formed therein, said biasing means includes a retaining ring engaged into said outer peripheral recesses of said jaws.

* * * * *